United States Patent [19]

Chen et al.

[11] Patent Number: 5,751,461
[45] Date of Patent: May 12, 1998

[54] EDGE-FLAT IMAGE SCANNING SYSTEM

[75] Inventors: Philip L. Chen, Rolling Hills, Calif.; Thomas Sheng, Hsin-Chu, Taiwan

[73] Assignee: Avision, Inc, Hsin-Chu, Taiwan

[21] Appl. No.: 526,358

[22] Filed: Sep. 11, 1995

[51] Int. Cl.6 ................................. G02B 26/08
[52] U.S. Cl. ..................... 359/201; 355/25; 358/474
[58] Field of Search ............................ 359/196, 197, 359/201, 212, 223; 250/234–236; 358/474, 475, 487, 494, 482, 483; 355/25, 228, 229, 232, 233, 82

[56] References Cited

U.S. PATENT DOCUMENTS 4,415,261  11/1983  Yukawa et al. ................ 355/231
4,695,151   9/1987  Watanabe ...................... 355/228

FOREIGN PATENT DOCUMENTS 0371765   6/1990  European Pat. Off. .......... 355/25

Primary Examiner—James Phan
Attorney, Agent, or Firm—H. C. Lin, Patent Agent

[57] ABSTRACT

This invention provides a flat-edge scanner capable of scanning a thick book without any distortion at the protruding binding edge. The binding edge of the book is placed at the corner of a scanning glass window and the frame supporting the glass window so that the book can lie snugly over the window. The scanning window area is extended to the edge of the frame supporting the scanning window. All the optical system and the driving mechanism lie inside the boundary of the scanning window to increase the scanning range.

8 Claims, 2 Drawing Sheets

EDGE-FLAT IMAGE SCANNING SYSTEM

This invention relates to an image scanning system, in particular, for scanning thick books without causing a distorted image due to protrusion at the binding edge.

BACKGROUND OF THE INVENTION

Flat-bed image scanners have become very popular as peripheral equipment for computers. A scanner can scan documents, magazines, books, figures, etc. for storage in a computer, which can then further process the information, or for sensitizing some photosensitive material in non-digital applications.

FIG. 1 shows the basic structure of a flat-bed scanner. In this structure, there is an image reading head 10, a scanning mechanism 4, an image processing circuit 5, a glass scanning window 2 and a frame 3. The optical reading system 10 includes a light source 1, reflecting mirrors 111, 112, 113, lens 12 and a charge coupled device (CCD) sensor 13. The scanning mechanism 4 includes a motor 41, gear trains 421, 422, an idler 423, a belt 43 for coupling the gears 422 and 423, a guiding rail 44 for the image reader 10, etc.

The operating principle of a conventional flat-bed scanner is as follows: As shown in FIG. 1, a document D to be scanned is placed on the window 2. An image of the document is obtained in the reflected light L of the incident light source 1 and is read by the image reading head 10. The image reflected by the mirrors 111–113 and the lens 12 is formed at the sensor 13. The signal received by the sensor 13 is processed by the processing circuit 5 for conversion into digital signals and inputted into a computer (not shown) for further processing. When the image sensor 13 receives a row or a section of image signals, the scanning mechanism 4 moves the image reading head 10 to another scanning position to scan over again until the complete image is read.

The image reading head 10 can also be attached to a laser writer to serve as a digital copier. Alternatively, the sensor can be a photosensitive drum for use in a non-digital copier.

In the present-day scanner in the market, when a book is scanned near the binding edge, the page of the book is protruded and cannot be in intimate contact with the glass window 2, as shown in FIG. 1. As a result, the scanned image becomes crooked and distorted. The usefulness of the scanner is greatly impaired. This is a serious problem which urgently needs a solution.

SUMMARY

The object of this invention is to provide a scanner which is capable of reading a thick book without any distortion. Another object of this invention is to minimize the size of the scanner.

These objects are achieved by extending the edge of scanning window of the scanner to the very edge of the frame supporting the window, and placing all the reflecting mirrors of the optical system and the driving mechanism within the boundary of the window. During scanning, the binding edge of the book is placed snugly at the corner between the frame and scanning window.

DETAILED DESCRIPTION OF THE PREFERRED EMBODIMENT

Figure 1:
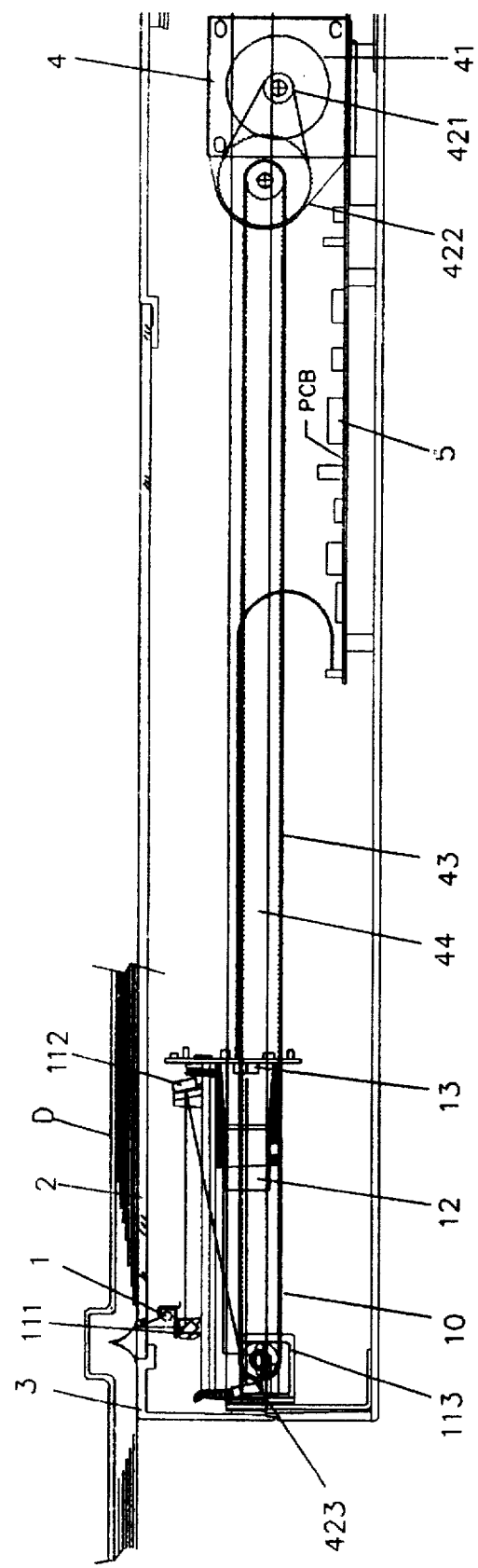
FIG. 1 shows the basic structure of a flat bed scanner.
Figure 2:
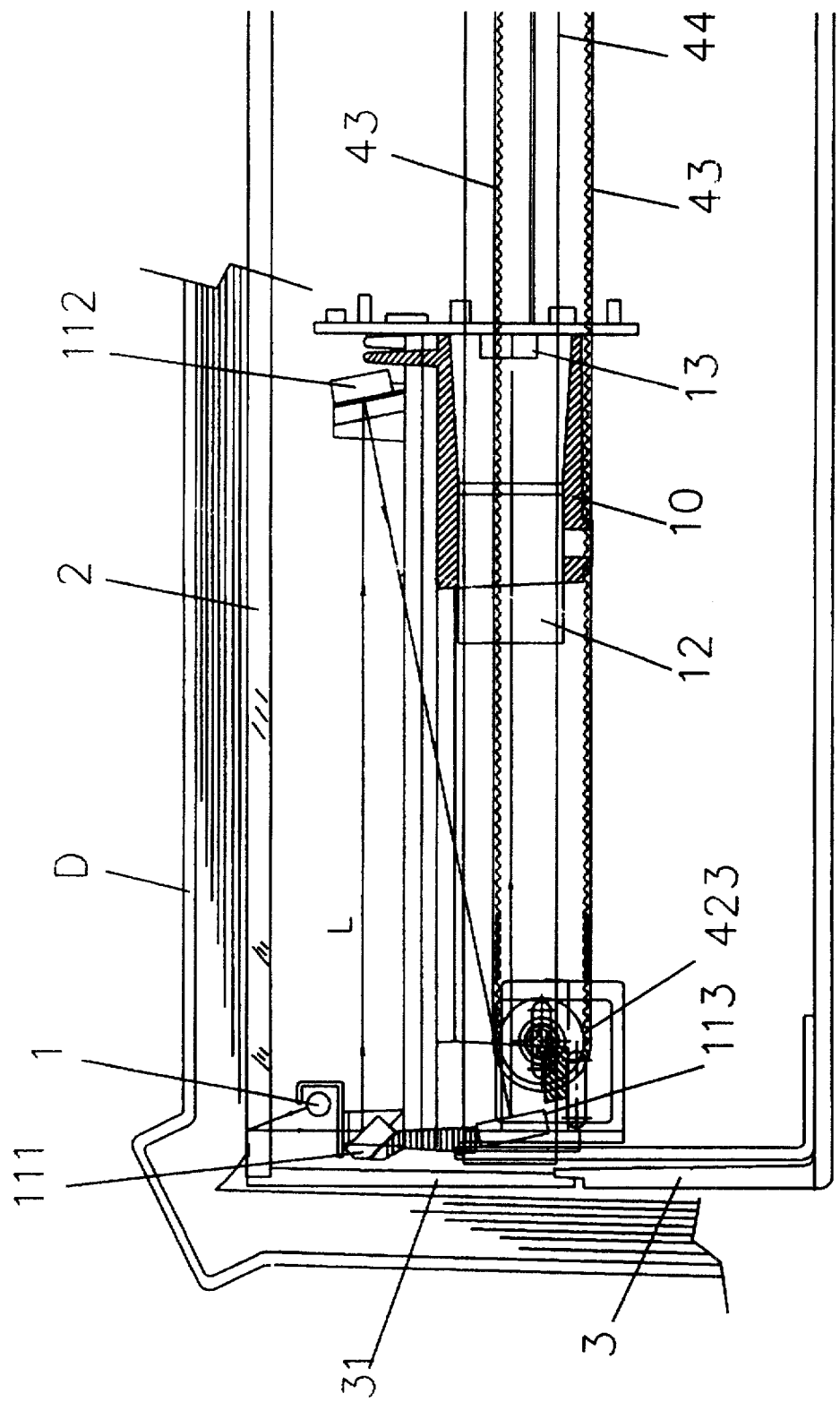
FIG. 2 shows a section of the scanner structure which this invention improves.

FIG. 2 shows a section of a scanner based on this invention. The general structure is similar to a conventional scanner. The feature of this invention lies in the light path of the image reading head 10 and the shape of the frame 3. As shown in the FIG. 2, the reflecting mirror 111 is placed under the light source 1. The placement of the reflecting mirror 113 is underneath and inside the reflecting mirror 111, and is different from that of conventional optical reading system which places the reflecting mirror 113 outside the reflecting mirror 111 as shown in FIG. 1. In so doing, the reflecting mirror 111 is placed at the outermost reading area of the image reading head. In the design of the outer shell of the frame 3, the scanning window is extended to the very edge of the scanner and connected to the side wall 31 of the frame 3. The idler 423 is located inside the reflecting mirror 113. When the motor 21 rotates, the idler 423 also rotates as driven by the driving belt 43. The image reading head 10 is fixed with respect to the driving belt 43 and sliding linearly with a shaft-and-bearing mechanism. With this design, the scanning point of the image reader 10 can reach the very edge of the scanning window up to the side wall 31 of the frame 3.

During scanning, the binding edge of a book D wraps snugly at the corner between the scanning window 2 and the frame 3, so that the binding region of the book D is in complete contact with the scanning window for effecting planar scanning without any distortion.

With this construction, the object of this invention can be achieved.

In another embodiment of FIG. 2, a corner of the reflecting mirror 111 can be chamfered to further extend the edge of the scanning area. This structure not only eliminates the distortion of the scanned image, but also reduces the physical size of the scanner.

As described above, this invention improves the flat bed scanner by moving inward the reflecting mirror 113 and the idler 423, and extending the scanning area to the edge of the scan window. In addition, by connecting the side wall 31 of the frame to the scan window, it is possible to scan the image up to the edge of the side wall. Thus, this invention not only eliminates the distortion, but also reduces the size of the scanner.

The foregoing description refers to a particular embodiment of this invention. The features of this invention are also applicable to a copier. Any variations of these features are within the scope of this invention.

What is claimed is:

1. A flat-edge image scanning system capable of scanning a document to the binding edge of a page for reducing distortion, comprising:

a frame with vertical supporting walls;

a scanning window lying on top of said frame, transparent up to said vertical supporting walls and capable of supporting said document with said binding edge placed at the corner between said frame and said scanning window;

an image reading head, comprising:

a scanning light source for illuminating said page to obtain optical signals, a series of reflecting mirrors for reflecting said optical signals of the area scanned by said light source to said image reading head, placed underneath said window and inside the boundary of said window so that the light source can scan to the supporting walls for reducing distortion caused due to protrusion at the binding edge and a light sensor for further processing said optical signals;

driving mechanism for sliding said image reading head underneath said scanning window along a rail using conventional driving mechanism.

2. A flat-edge scanner as described in claim 1, wherein said light sensor is used to convert said optical signals into electrical signals.

3. A flat-edge scanner as described in claim 2, wherein said electrical signals are digital.

4. A flat-edge scanner as described in claim 3, wherein said electrical signals are used in a digital printer.

5. A flat-edge scanner as described in claim 4, wherein said digital printer is a laser printer.

6. A flat-edge scanner as described in claim 1, wherein said optical signals are used to scan a non-digital copier.

7. A flat-edge scanner as described in claim 6, wherein said optical signals are used to scan a photosensitive drum.

8. A flat-edge scanner as described in claim 1, wherein at least one of said reflecting mirrors is chamfered to extend the scanning range of said image reading head.

* * * * *